(12) United States Patent
Chen et al.

(10) Patent No.: US 11,006,614 B2
(45) Date of Patent: May 18, 2021

(54) SMART PET FEEDER (71) Applicant: Dogness Group LLC, Plano, TX (US)

(72) Inventors: Silong Chen, Dongguan (CN); Yunhao Chen, Plano, TX (US)

( * ) Notice: Subject to any disclaimer, the term of this patent is extended or adjusted under 35 U.S.C. 154(b) by 231 days.

(21) Appl. No.: 16/147,612

(22) Filed: Sep. 29, 2018

(65) Prior Publication Data
US 2020/0100460 A1 Apr. 2, 2020

(51) Int. Cl.
*A01K 5/02* (2006.01)
*A01K 29/00* (2006.01)

(52) U.S. Cl.
CPC .......... *A01K 5/0225* (2013.01); *A01K 29/005* (2013.01)

(58) Field of Classification Search
CPC .. A01K 5/0225; A01K 5/0275; A01K 15/021; B65G 65/46; B65G 65/463; G01F 13/005; A47J 31/404
See application file for complete search history.

(56) References Cited

U.S. PATENT DOCUMENTS

| | | | | |
|---|---|---|---|---|
| 1,540,290 A | * | 6/1925 | Selinger | A01K 5/0225 119/56.1 |
| 2,747,546 A | * | 5/1956 | Winter | A01K 5/0225 119/57.1 |
| 6,988,464 B1 | * | 1/2006 | Rutledge | A01K 5/0114 119/51.01 |
| 7,832,663 B1 | * | 11/2010 | Cotham | A01C 15/02 239/653 |
| 8,066,206 B1 | * | 11/2011 | Cotham | A01C 7/02 239/653 |
| 8,707,900 B1 | * | 4/2014 | Womble | A01K 15/025 119/51.5 |
| 2011/0139076 A1 | * | 6/2011 | Pu | A01K 5/0114 119/51.02 |
| 2011/0174224 A1 | * | 7/2011 | Brooks | A01K 5/0275 119/57.92 |
| 2012/0068392 A1 | * | 3/2012 | Thillen | F27D 3/10 266/200 |
| 2015/0342145 A1 | * | 12/2015 | Christianson | A01K 29/00 119/51.11 |

(Continued)

FOREIGN PATENT DOCUMENTS

| | | | | | |
|---|---|---|---|---|---|
| CN | 205596856 U | * | 9/2016 | | A01K 5/02 |
| CN | 107114257 A | * | 9/2017 | | A01K 5/02 |
| CN | 206452983 U | * | 9/2017 | | A01K 5/02 |

*Primary Examiner* — Magdalena Topolski
*Assistant Examiner* — Arfan Y. Sinaki
(74) *Attorney, Agent, or Firm* — ZANIP (57) ABSTRACT

The smart pet feeder includes a housing, and a grain storage component arranged in an upper part of the housing, a driving component arranged in a middle part of the housing and a throwing component arranged in a lower part of the housing; a rotating component is arranged in the housing, and the rotating component has a supporting column, the upper part of the supporting column is provided with a wheel, the lower part of the supporting column is provided with a driving gear, the bottom end of the supporting column is provided with a cam; the upper part is extended into the grain storage component, and the wheel is contained in the grain storage component; the driving gear is rotatably connected with the driving component, the cam is connected with the throwing component in the housing.

15 Claims, 8 Drawing Sheets

(56) References Cited

U.S. PATENT DOCUMENTS

| | | | |
|---|---|---|---|
| 2016/0007565 A1* | 1/2016 | Trottier | A01K 5/02 |
| | | | 119/51.02 |
| 2016/0257481 A1* | 9/2016 | Milner | A01K 29/005 |
| 2017/0042116 A1* | 2/2017 | Lindskov | A01K 5/0114 |
| 2017/0280674 A1* | 10/2017 | Davis | A01K 5/02 |
| 2018/0035638 A1* | 2/2018 | Luttrell | A01K 5/0275 |
| 2018/0125031 A1* | 5/2018 | Silverman | A01K 5/0275 |
| 2018/0160648 A1* | 6/2018 | Goh | H04L 67/125 |

* cited by examiner

SMART PET FEEDER

FIELD OF THE INVENTION

The present invention relates to feeder technical field, more specifically relates to smart pet feeder.

BACKGROUND OF THE INVENTION

With the increasing number of pets, the rational and safe feeding of pets, monitoring and interaction have become an urgent problem. There are many kinds of pets accompanying smart robots in the market. Most of them includes a housing, control device, feeding device, launcher and linkage. The control device controls the linkage, therefore convenient controlling the launcher and the feeding device. Users can interact with their pets remotely when they are out. In the smart robots, some of the linkage use variable speed motor and gear to push piston to feed, others use variable speed motor to drive pull rod to feed. But this kind of linkage leads to the unreasonable configuration of the smart robot for pet company, the problem of feeding and feeding process, and the poor effect of feeding.

SUMMARY OF THE INVENTION

The object of the present invention is to provide a smart pet feeder, which solves the unreasonable structure setting of the existing linkage device, which leads to problems in the delivering process and the feeding process of the smart pet feeder, and the feeding effect is poor.

The technologies in the present invention are as follows: a smart pet feeder includes a housing, and a grain storage component arranged in an upper part of the housing, a driving component arranged in a middle part of the housing and a throwing component arranged in a lower part of the housing; a rotating component is arranged in the housing, and the rotating component has a supporting column; the upper part of the supporting column is provided with a wheel, the lower part of the supporting column is provided with a driving gear, the bottom end of the supporting column is provided with a cam; the upper part of the supporting column is extended into the grain storage component, and the wheel is contained in the grain storage component; the driving gear is rotatably connected with the driving component, the cam is connected with the throwing component; the grain storage component is provided with an upper feeding channel, the throwing component has a throwing grain channel, a lower feeding channel communicates the upper feeding channel and the throwing grain channel; the driving component drives the driving gear to rotate, therefor driving the supporting column, the wheel and the cam to rotate synchronously, the wheel agitates grain in the grain storage component to fall into the upper feeding channel, the gain falls into the throwing grain channel by the lower feeding channel and is thrown out by the throwing component.

The driving component includes a motor, a belt pulley and a worm; one end of the belt pulley is fixed with the motor, the other end of the belt pulley is fixed with the worm, and the helical teeth of the worm are meshed with the driving gear.

The belt pulley comprises a small belt pulley, a large belt pulley, a connecting shaft, a synchronous wheel, a first belt and a second belt; the small pulley is fixed at the connecting shaft, and the large pulley is fixed at the worm; the motor has a shaft which is provided with a driving wheel; the first belt connects the small pulley and the driving wheel, the second belt connects the large pulley and the synchronization wheel. The synchronous wheel is fixed on the connecting shaft; the motor drives the driving wheel to rotate, thereby driving the worm to rotate through the first belt and the second belt.

The grain storage component includes a grain storage tank and a grain delivery assembly arranged below the grain storage tank; the top of the grain storage tank is provided with an opening, and the side wall of the grain storage tank is provided with an inclined downwardly grain guiding plate, the bottom of the grain guiding plate is provided with the grain mouth; the grain delivery assembly has a top cover, and the middle of the top cover is depressed to form a groove, a notch is formed on one side of the end cover and that side of the groove, and at the notch a step surface is formed by extending from the bottom of the groove downwardly; a baffle is arranged at the lower part of the step surface, and a feeding port is formed between the step surface and the baffle; the end cover is provided with a plate at the notch, the plate has a horizontal part and a vertical part; the horizontal part blocks the notch from the top of the notch, and the edge of the horizontal part is provided with a tooth slice extending into the groove; the vertical part matches the step surface and the baffle to form the upper feeding channel.

The bottom of the grain guiding plate is also provided with an first column hole; the top of the supporting column rotatably passes through the first column hole into the grain storage tank; the top of the supporting column is provided with a wing.

The bottom surface center of the groove forms a second column hole, the upper part of the supporting column rotatably passes through the second column hole into the groove, and the wheel is placed in the groove; the edges of the wheel are composed of protrusions and recesses arranged alternately and uniformly.

The below of the grain storage assembly is provided with an upper mounting member; the upper mounting member has a mounting plate, and the center of the mounting plate forms a third column hole; one side of the mounting plate is provided with the lower feeding channel, the top of the lower feeding channel is connected with the bottom of the upper feeding channel, and the lower feeding channel and the bottom of the upper feeding channel are matched in shape; the bottom of the lower feeding channel has a feed opening.

The other side of the mounting plate is provided with an installation slot, the installation slot is provided with a mounting cover on it; the mounting cover is provided with a groove cover matched with the installation slot; the side of the groove cover is provided with a vortex rod cover.

The driving component includes a motor, a belt pulley and a worm; one end of the belt pulley is fixed with the motor, the other end of the belt pulley is fixed with the worm, and the helical teeth of the worm are meshed with the driving gear.

The belt pulley and the worm are pivoted with the installation slot; the worm passes through the installation slot and is erected on the mounting plate; the belt pulley is set in the installation slot; the mounting cover partly covers the belt pulley; the vortex rod cover is set the worm and covered it.

The lower part of the supporting column rotates through the third column hole; the driving gear is arranged above the mounting plate and meshes with the spiral teeth of the worm.

The throwing component is arranged below the upper mounting member, including a throwing grain channel, a spring rod, a pushing plate and a seat; the throwing grain channel is arranged in a cylindrical shape, one end of which extends to form an arc groove; the arc groove matches the feed opening so that the grain can be fed into the throwing grain channel from the lower feeding channel; a feeding port is arranged on one side of the shell, and the throwing grain channel is directly opposite the feeding port; one end of the spring rod is inserted into the seat, the middle of the spring rod is provided with a limiting plate, the other end of the spring rod is inserted into the throwing grain channel, and a pushing piece is arranged at thereof; the pushing piece matches the inner cavity of the throwing channel and can slide therein; the spring rod is provided with a spring between the limiting plate and the seat; the pushing plate has an pivot end and a plug end, the pivot end is pivoted at the bottom of the installation plate, and the plug end is arranged between the limiting plate and the throwing grain channel, the plug end is provided with an inserting slot, and the spring rod passes through the plug end at the inserting slot; the pushing plate is also provided with a cam groove; the edge of the cam is provided with a plurality of gear teeth; the gear teeth can extend into the cam groove and push the pushing plate to rotate.

A side wall of the grain storage tank is provided with a camera component, which including a camera and an infrared night vision lamp.

the smart pet feeder also includes a control unit; the control unit includes a control module and a wireless communication module; the control module is electrically connected with the wireless communication module, the driving component and the camera component, respectively; the wireless communication module receives instructions from the client and feeds back to the control module, which controls the driving component or the camera component to operate according to the instructions.

The smart pet feeder also includes a control unit, the control unit includes a control module, a feeding module, and a detecting module; the control module is electrically connected with the feeding module, the detecting module and the driving component.

The control unit also includes an infrared detection module; the infrared detection module is electrically connected with the control module; the infrared detection module is used to detect food retention in the upper feeding channel; if a food retention is detected, a food retention feedback signal is sent to the control module, which controls the driving component to stop running.

The control unit also includes a manual feeding module; the manual feeding module is electrically connected with the control module, and the manual feeding module is triggered, and the control module controls the driving component to run.

The working principle of the smart pet feeder of the utility model is as follows:

a smart pet feeder includes a housing, and a grain storage component arranged in an upper part of the housing, a driving component arranged in a middle part of the housing and a throwing component arranged in a lower part of the housing; a rotating component is arranged in the housing, and the rotating component has a supporting column; the upper part of the supporting column is provided with a wheel, the lower part of the supporting column is provided with a driving gear, the bottom end of the supporting column is provided with a cam; the upper part of the supporting column is extended into the grain storage component, and the wheel is contained in the grain storage component; the driving gear is rotatably connected with the driving component, the cam is connected with the throwing component; the driving component drives the driving gear to rotate, therefor driving the supporting column, the wheel and the cam to rotate synchronously, grain in the grain storage component is transported to the throwing component and is thrown out by the throwing component. The rotating component synchronously combines the driving component, the grain storage component and the throwing component, plays a linkage role and realizes the continuity of delivering and feeding. It has good feeding effect.

DETAILED DESCRIPTION OF ILLUSTRATED EMBODIMENTS

The further explanation is made as follows in combination with the embodiments, which are the preferable embodiments in the present invention.

Figure 1:
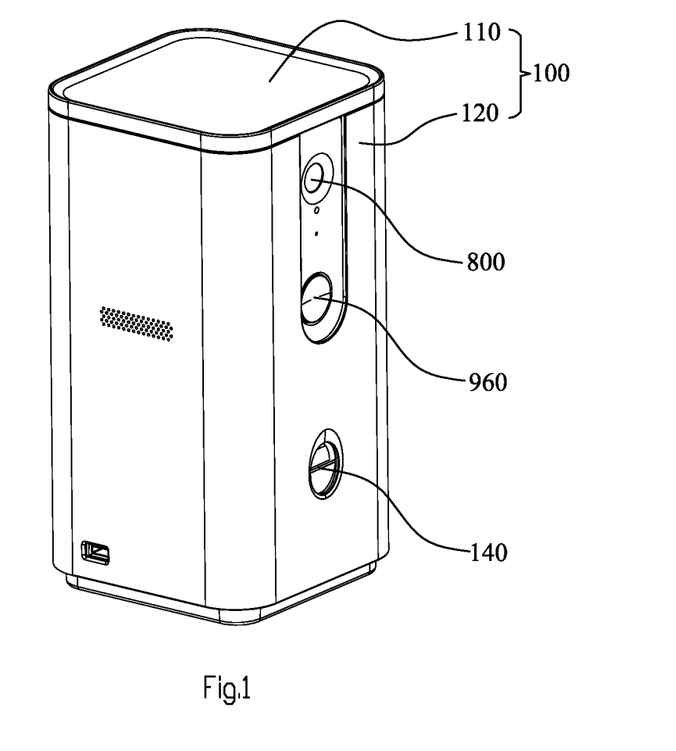
FIG. 1 is a stereoscopic diagram of the smart pet feeder in the present invention.
Figure 2:
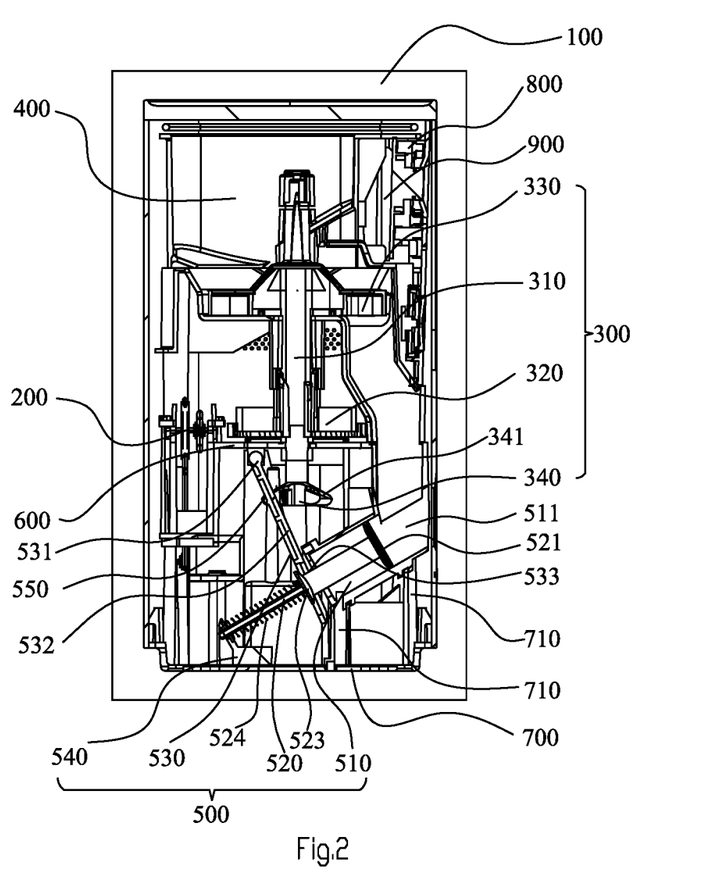
FIG. 2 is a cross-sectional view of the smart pet feeder in the present invention.
Figure 3:
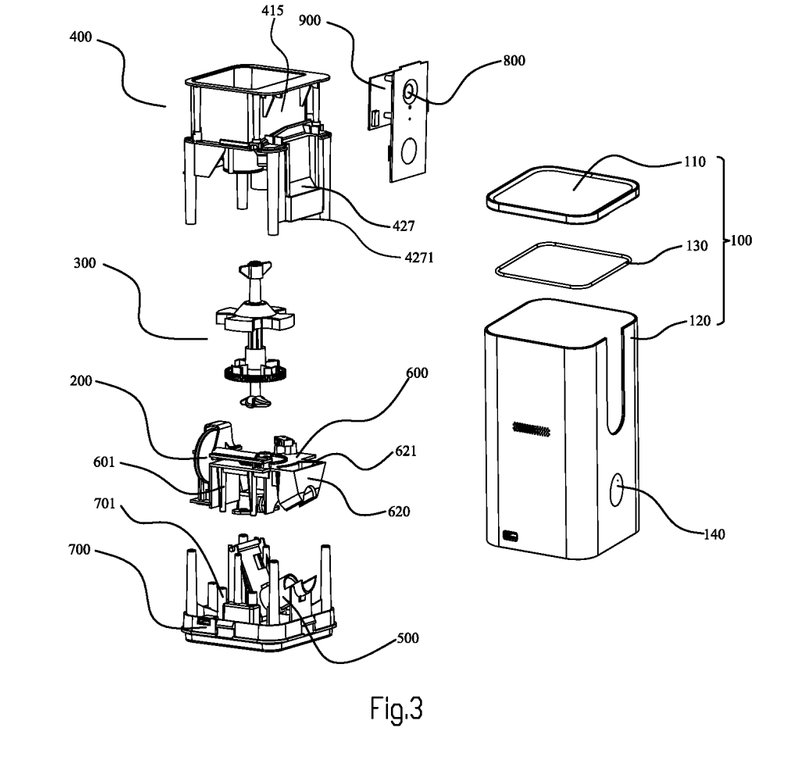
FIG. 3 is a decomposition diagram of the smart pet feeder in the present invention.

Referring to FIG. 1, FIG. 2 and FIG. 3, a smart pet feeder includes a housing 100, and a driving component 200, a rotating component 300, a grain storage component 400 and a throwing component 500 arranged inside the housing 100. The housing 100 has an empty cavity, which is compose of a cover 110 and a shell 120. The cover 110 covers the shell 120, the two can be pivoted or detachable according to the designer's needs. The present invention does not limit it. Preferably, the joints of the cover 110 and the shell 120 are provided with a waterproof ring 130, which ensures the sealing of the product, avoids water seepage into the housing 100, and affects the working stability of the driving component 200, the rotating component 300, the grain storage assembly 400 and the throwing component 500 in the housing 100.

Figure 4:
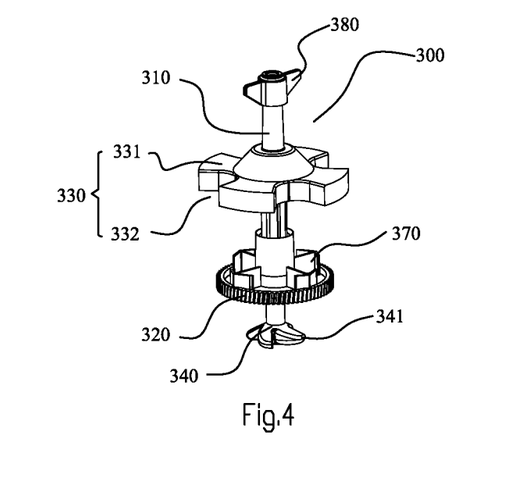
FIG. 4 is a schematic diagram of the rotating component in the present invention.

Referring to FIG. 2, FIG. 3 and FIG. 4, the grain storage component 400 is arranged in the upper part of the shell 120, the driving component 200 is arranged in the middle of the shell 120, and the throwing component 500 is arranged in the lower part of the shell 120. The rotating component 300 has a supporting column 310, the upper part of the supporting column 310 is passed through the grain storage component 400 and is provided with a wheel 330, the lower part of the supporting column 310 is provided with a driving gear 320, the bottom end of the supporting column 310 is provided with a cam 340. The driving gear 320 is rotatably connected with the driving component 200, the cam 340 is connected with the throwing component 500. The driving component 200 drives the driving gear 320 to rotate, therefor driving the supporting column 310 and the wheel 330 and the cam 340 on it to rotate synchronously, the grain in the grain storage component 400 is transported to the throwing component 500 and is thrown out by the throwing component 500. The rotating component 300 synchronously combines the driving component 200, the grain storage component 400 and the throwing component 500, plays a linkage role and realizes the continuity of delivering and feeding. It has good feeding effect.

Figure 5:
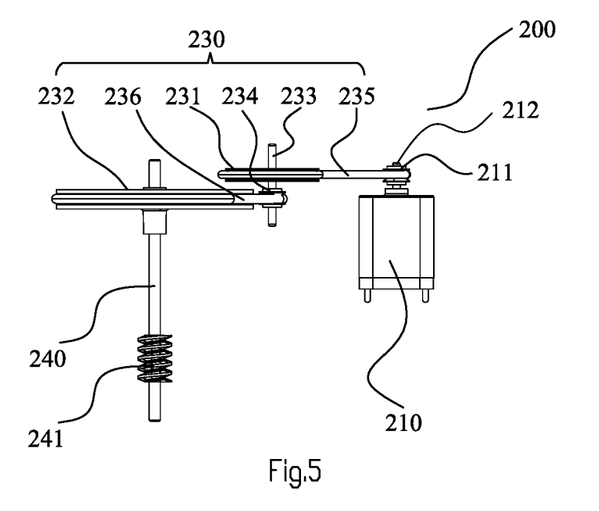
FIG. 5 is a schematic diagram of the driving component in the present invention.

Referring to FIG. 5, the driving component 200 includes a motor 210, a belt pulley 230 and a worm 240. One end of the belt pulley 230 is fixed with the motor 210, the other end of the belt pulley 230 is fixed with the worm 240, and the helical teeth 241 of the worm 240 are meshed with the driving gear 320. The driving component 200 drives the belt pulley 230 to rotate, thereby driving the worm 240 to rotate, causing the rotation component 300 to rotate through the mesh of the driving gear 320 and the helical teeth 241 of the worm 240.

The belt pulley 230 may be set as a single belt wheel or a double belt wheels. Preferably, the belt pulley 230 is a double belt wheels, comprising a small belt pulley 231, a large belt pulley 232, a connecting shaft 233, a synchronous wheel 234, a first belt 235 and a second belt 236. The small pulley 231 is fixed at the connecting shaft 233, and the large pulley 232 is fixed at the worm 240. The shaft 212 of the motor 210 is provided with a driving wheel 211. The first belt 235 twines the small pulley 231 and the driving wheel 211 to connect them, the second belt 236 twines the large pulley 232 and the synchronization wheel 234 to connect them. The synchronous wheel 234 is fixed on the connecting shaft 233. The motor 210 drives the driving wheel 211 to rotate, thereby driving the worm 240 to rotate through the first belt 235 and the second belt 236.

Figure 6:
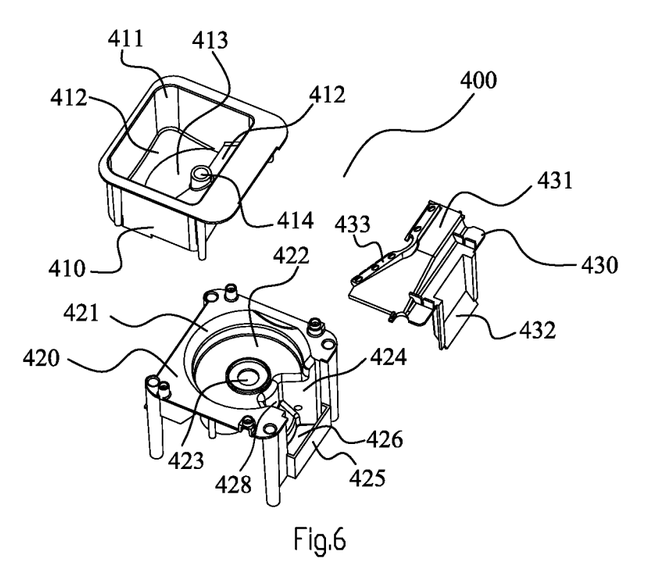
FIG. 6 is a decomposition diagram of the grain storage component in the present invention.

Referring to FIG. 6, the grain storage component 400 includes a grain storage tank 410 and a grain delivery assembly 420 arranged up and down. The top of the grain storage tank 410 is provided with the opening 411, and the side wall 415 of the grain storage tank 410 is provided with an downwardly inclined grain guiding plate 412, the bottom of the grain guiding plate 412 is provided with the grain mouth 413. The bottom of the grain guiding plate 412 is also provided with a column hole 414. The top of the supporting column 310 rotatably passes through the first column hole 414 into the grain storage tank 410, and the top of the supporting column 310 is provided with a wing 380. On one hand, the wing 380 prevents the top of the supporting column 310 from falling off the first column hole 414, on the other hand, when the supporting column 310 rotates, the wing 380 stirs the grain in the grain storage tank 410 so as to assist in the grain to fall down.

Figure 7:
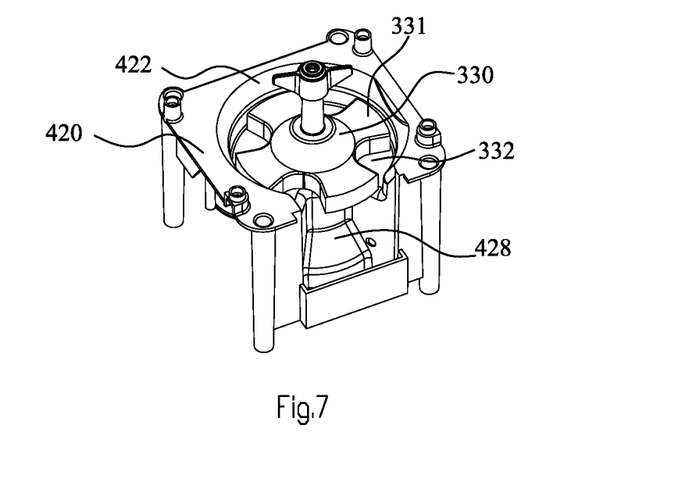
FIG. 7 is a schematic diagram of the combination of the grain delivery assembly 420 and the rotating component in the present invention.

Referring to FIG. 6 and FIG. 7, the grain delivery assembly 420 has a top cover 421, and the middle of the top cover 421 is depressed to forms a groove 422, and the bottom surface center of the groove 422 forms a second column hole 423 downwardly. A notch 428 is formed on one side of the end cover 421 and that side of the groove 422, and a step surface 424 is formed by extending the bottom of the groove 422 downwardly. A baffle 425 is arranged at the lower part of the step surface 424, and a feeding port 426 is formed between the step surface 424 and the baffle 425. The end cover 421 is provided with a plate 430 at the notch 428, the plate 430 has a horizontal part 431 and a vertical part 432. The horizontal part 431 blocks the notch 428 from above, and the edge of the horizontal part 431 is provided with a tooth slice 433 extending into the groove 422. The vertical part 432 matches the step surface 424 and the baffle 425 to form an upper feeding channel 427.

The upper part of the supporting column 310 rotatably passes through the second column hole 423 into the groove 422, and the wheel 330 is placed in the groove 422. The edges of the wheel 330 are composed of protrusions 331 and recesses 332 arranged alternately and uniformly.

The grain is placed into the grain storage tank 410 from the opening 411, falling along the grain guiding plate 412 into the groove 422 of the grain delivery assembly 420 through the grain mouth 413. When the driving component 200 drive the rotating component 300 to rotate, the protrusions 331 of the grain delivery wheel 330 agitates the grain with the tooth slice 433, the grain falls into the upper feeding channel 427 from the recesses 332.

The grain storage tank 410 and the grain delivery assembly 420 can be formed in one body or can be arranged as two separating pieces. For installation convenience, the two separating pieces is the better way. In this case, the connection mode of the grain storage tank 410 and the grain delivery assembly 420 is preferably detachable connection. In the embodiment, the periphery of the grain storage tank 410 and the grain delivery assembly 420 are respectively provided with mutually pluggable columns and column holes. It should be understood that the connection between the two can also be locking connection or thread connection.

Figure 8:
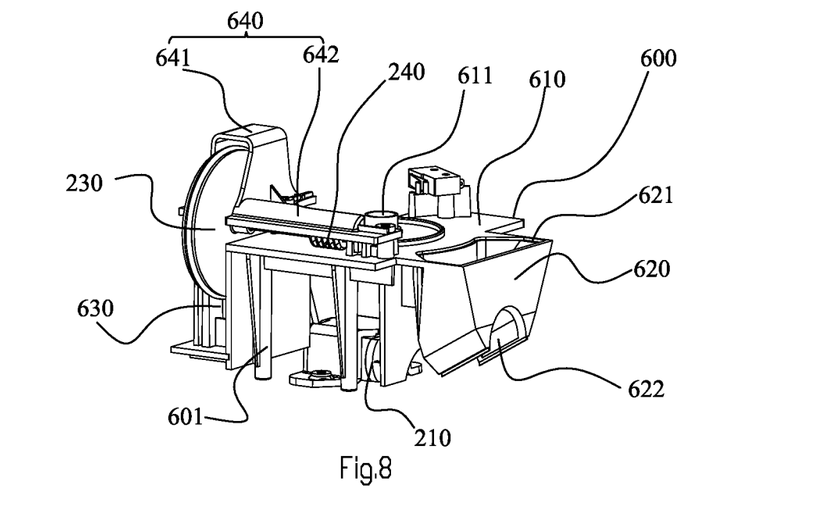
FIG. 8 is a schematic diagram of the upper mounting member in the present invention.

Referring to FIG. 2, FIG. 3 and FIG. 8, the below of the grain storage assembly 400 is provided with an upper mounting member 600. The upper mounting member 600 has a mounting plate 610, and the center of the mounting plate 610 forms a third column hole 611. One side of the mounting plate 610 is provided with a lower feeding channel 620, the top 621 of which is connected with the bottom 4271 of the upper feeding channel 427, mand the shape of the two is matched. The bottom of the lower feeding channel 620 has a feed opening 622.

The other side of the mounting plate 610 is provided with an installation slot 630, the installation slot 630 is provided with a mounting cover 640 on it. The mounting cover 640 is provided with a groove cover 641 matched with the installation slot 630. The side of the groove cover 641 is provided with a vortex rod cover 642.

The belt pulley 230 and the worm 240 are pivoted on the upper mounting member 600. The belt pulley 230 and the worm 240 are pivoted with the installation slot 630. The worm 240 passes through the installation slot 630 and is erected on the mounting plate 610. The belt pulley 230 is set in the installation slot 630. The mounting cover 641 partly covers the belt pulley 230. The vortex rod cover 642 is set the worm 240 covering it. Concretely, the connecting shaft 233 and the worm 240 are pivoted on the mounting slot 630. The worm 240 passes through the wall of the mounting groove 630 and is erected on the mounting plate 610. The small belt pulley 231 and the large belt pulley 232 are set in the installation slot 630, The mounting cover 641 partly covers the small belt pulley 231 and the large belt pulley 232. The vortex rod cover 642 is the worm 240 to cover it. The motor 210 is mounted on the bottom of the shell 120.

The lower part of the supporting column 310 rotates through the third column hole 611. The driving gear 320 is arranged above the mounting plate 610 and meshes with the spiral teeth of the worm 240. The cam 340 is arranged at the bottom of the support column 310.

Figure 9:
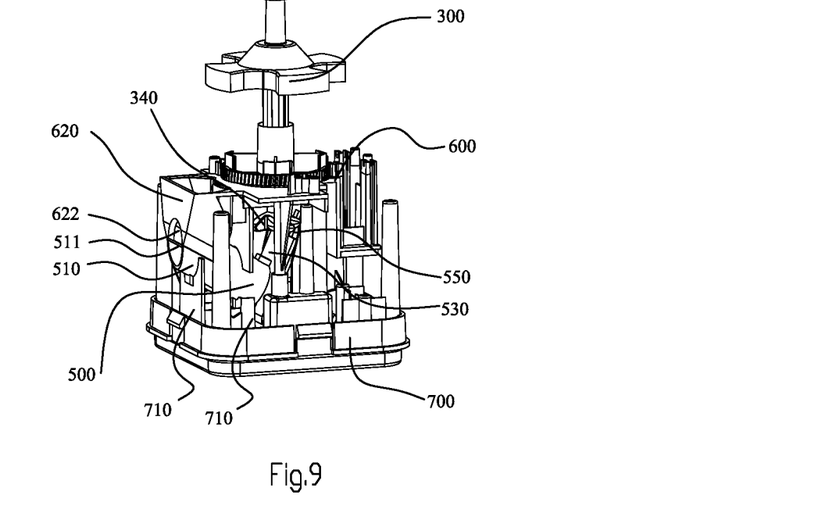
FIG. 9 is a schematic diagram of the combination of the rotating components and the throwing components in the present invention.
Figure 10:
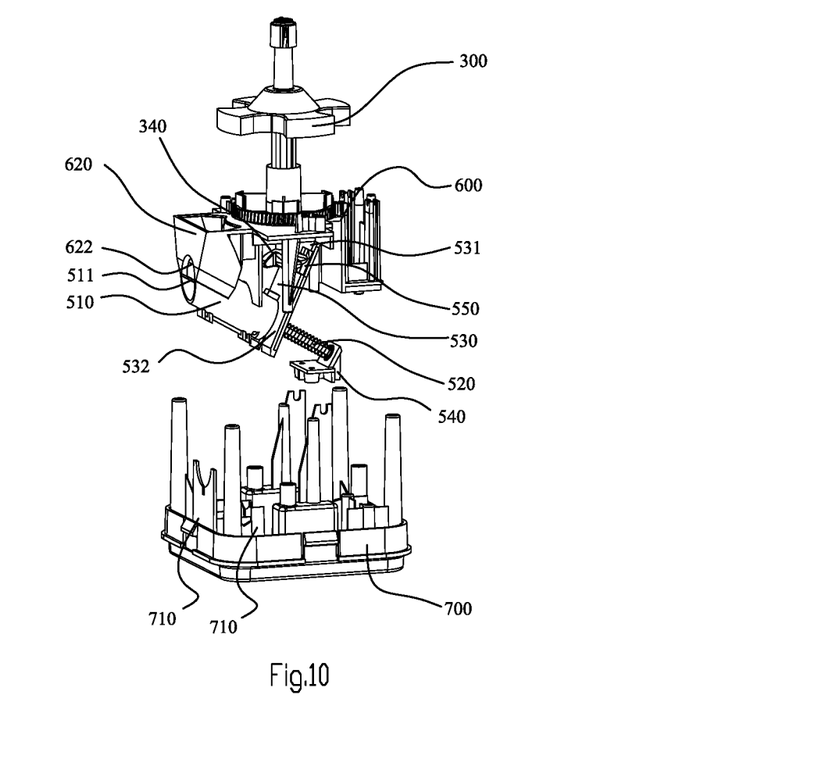
FIG. 10 is a decomposition diagram of rotating components and the throwing components in the present invention.

Referring to FIG. 2, FIG. 9 and FIG. 10, the throwing component 500 is arranged below the upper mounting member 600, including a throwing grain channel 510, a spring rod 520, a pushing plate 530, and a seat 540. The throwing grain channel 510 is arranged in a cylindrical shape, one end of which extends to form an arc groove 511. The arc groove 511 matches the feed opening 622 so that the grain can be fed into the throwing grain channel 510 from the lower feeding channel 620. A feeding port 140 is arranged on one side of the shell 100, and the throwing grain channel 510 is directly opposite the feeding port 140. One end of the spring rod 520 is inserted into the seat 540, the middle of the spring rod 520 is provided with a limiting plate 523 and the other end of the spring rod 520 is inserted into the throwing grain channel 510, and a pushing piece 521 is arranged at thereof. The pushing piece 521 matches the inner cavity of the throwing channel 510 and can slide therein. The limiting plate 523 is arranged out of the throwing grain channel 510, the spring rod 520 is provided with a spring 524 between the limiting plate 523 and the seat 540. The pushing plate 530 has a pivot end 531 and a plug end 532, the pivot end 531 is pivoted at the bottom of the installation plate 610, and the plug end 532 is arranged between the limiting plate 523 and the throwing grain channel 510. The plug end 532 is provided with an inserting slot 533, and the spring rod 520 passes through the plug end 532 at the inserting slot 533. The pushing plate 530 is also provided with a cam groove 550. The edge of the cam 340 is provided with a plurality of gear teeth 341. The gear teeth 341 can extend into the cam groove 550. During the rotation process of the rotating component 300, the gear tooth 341 reaches and pushes the pushing plate 530 so that the plug end 532 rotates around the pivot end 531, the limiting plate 523 and the pushing plate 530 are pushed in the direction of the seat 540, and the spring 524 is compressed by the seat 540 against the pressure. After the gear teeth 341 leaves the pushing plate 530, the spring 524 resets, pushing the limiting plate 523 to make it slide backwardly, thereby pushing out the grain in the throwing grain channel 510 through the feeding mouth 140, thus completing the feeding operation.

A lower mounting member 700 is provided below the throwing component 500. The lower mounting 700 is provided with two supporting plates 710. The two supporting plates 710 support the throwing channel 510. The upper mounting member 600 and the lower mounting member 700 are respectively provided with a column 601 and a column hole 701 which are interleaved with each other so as to realize the connection.

Figure 11:
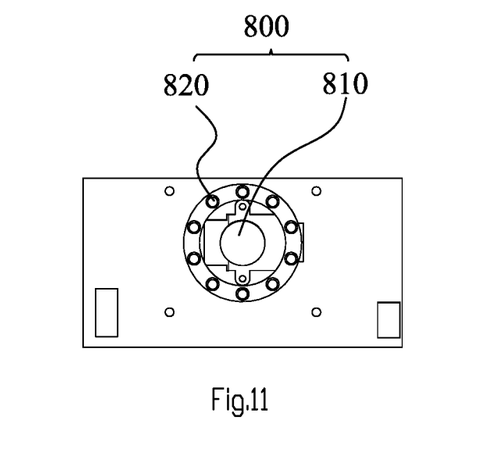
FIG. 11 is a schematic diagram of the camera assembly in the present invention.

Referring to FIG. 11, the camera component 800 is mounted on a side wall of the grain storage tank 410. The camera component 800 includes a camera 810 and an infrared night vision lamp 820. The camera 810 is a 160-degree wide-angle high-definition camera to monitor pets in real time. In addition, the infrared night vision lamp 820 can realize the monitoring of pets at night.

Figure 12:
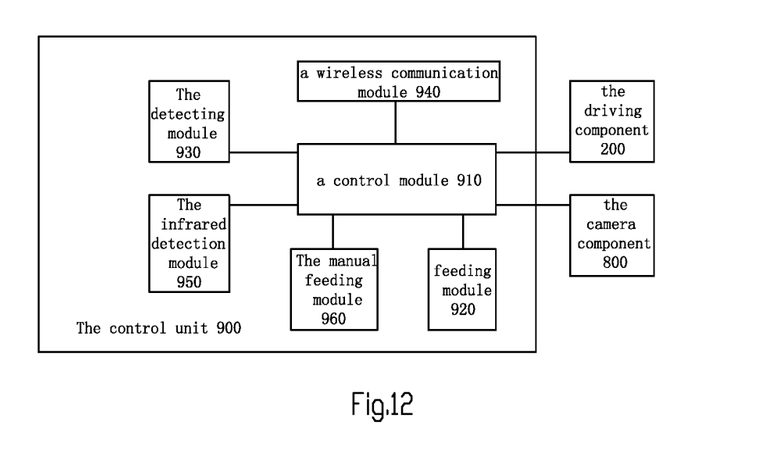
FIG. 12 is a schematic diagram of the control unit in the present invention.

Referring to FIG. 12, the smart pet feeder also includes a control unit 900. The control unit 900 includes a control module 910 and a wireless communication module 940. The control module 910 is electrically connected with the wireless communication module 940, the driving component 200 and the camera component 800, respectively. The wireless communication module 940 receives instructions from the client and feeds back to the control module 910, which controls the driving component 200 or the camera component 800 to operate according to the instructions.

Figure 13:
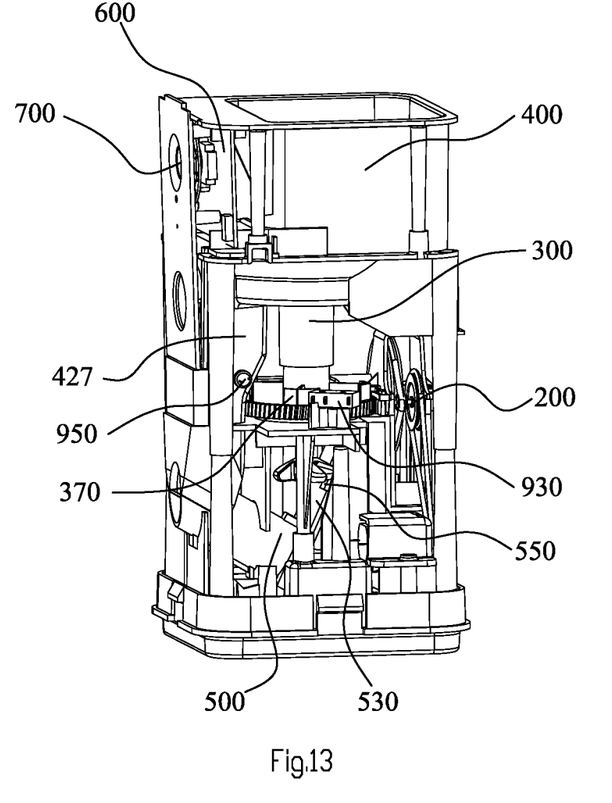
FIG. 13 is a schematic diagram of the intelligent pet feeder in the present invention.

Referring to FIG. 12 and FIG. 13, the control unit 900 includes a control module 910, a feeding module 920, and a detecting module 930. The control module 910 is electrically connected with the feeding module 920, the detecting module 930 and the driving component 200. Concretely, the driving gear 320 is provided with a convex 370 that triggers the detecting module 930. The detecting module 930 sends a feeding feedback signal to the control module 910 once triggered by the convex 370.

Preferably, the control unit 900 also includes an infrared detection module 950. The infrared detection module 950 is electrically connected with the control module 910. Further, the infrared detection module 950 is mounted on the upper feeding channel 427. The infrared detection module 950 is used to detect food retention in the upper feeding channel 427. If a food retention is detected, a food retention feedback signal is sent to the control module 910, which controls the motor 210 to stop running.

Preferably, the control unit 900 also includes a manual feeding module 960. The manual feeding module 960 is electrically connected with the control module 910, and the manual feeding module 960 is triggered, and the control module 910 controls the driving motor 910 to run.

In automatic mode, the control module 910 controls the driving motor 210 to run according to the number of feeding portions set by the feeding module 920. The driving motor 210 drives the supporting column 310 to rotate, The wheel 330 rotates synchronously to transport food from the grain storage tank 410 to the throwing grain channel 510. On the other hand, the cam 340 rotates synchronously, pushing the pushing plate 530 and the limiting plate 523 in the direction of the seat 540, and the spring 524 is compressed, After the gear teeth 341 turn around the push plate 530, the spring 524 resets, the push plate 530, pushing the push plate 530 backward, thus pushing out the grain in the throwing grain channel 510 through the feeding mouth 140 to complete the feeding operation.

In manual mode, trigger the manual feeding module 960, the manual feeding module 960 feeds back the feeding signal to the control module 910, and the control module 910 controls the driving motor 210 to run. The driving motor 210 drives the supporting column 310 to rotate, The wheel 330 rotates synchronously to transport food from the grain storage tank 410 to the throwing grain channel 510. On the other hand, the cam 340 rotates synchronously, pushing the pushing plate 530 and the limiting plate 523 in the direction of the seat 540, and the spring 524 is compressed, After the gear teeth 341 turn around the push plate 530, the spring 524 resets, the push plate 530, pushing the push plate 530 backward, thus pushing out the grain in the throwing grain channel 510 through the feeding mouth 140 to complete the feeding operation.

In remote control mode, the wireless communication module 940 receives feeding instructions from the client and feeds back to the control module 910. The control module 910 controls the driving motor 210 to run according to the feeding instruction. The driving motor 210 drives the supporting column 310 to rotate, The wheel 330 rotates synchronously to transport food from the grain storage tank 410 to the throwing grain channel 510. On the other hand, the cam 340 rotates synchronously, pushing the pushing plate 530 and the limiting plate 523 in the direction of the seat 540, and the spring 524 is compressed. After the gear teeth 341 turn around the push plate 530, the spring 524 resets, the push plate 530, pushing the push plate 530 backward, thus pushing out the grain in the throwing grain channel 510 through the feeding mouth 140 to complete the feeding operation.

The wireless communication module 940 receives monitoring instructions from the client and feeds back to the control module 910, which controls the camera component 800 operation according to the monitoring instruction. The camera 810 and the infrared night vision lamp 820 enter the state of monitoring pet, and the wireless communication module 940 transmits the captured real-time state to the user.

While the specification has described in detail certain exemplary embodiments, it will be appreciated that those skilled in the art, upon attaining an understanding of the foregoing, may readily conceive of alterations to, variations of, and equivalents to these embodiments. The foregoing preferred embodiments of the present invention are illustrated of the present invention rather than limiting of the present invention. It is intended to cover various modifications and changes included within the spirit and scope of the appended claims, the scope of which should be accorded the broadest interpretation so as to encompass all such modifications and similar structures.

What is claimed is:

1. A smart pet feeder comprising a housing, and a grain storage component arranged in an upper part of said housing, a driving component arranged in a middle part of said housing and a throwing component arranged in a lower part of said housing; a rotating component is arranged in said housing, and said rotating component has a supporting column; an upper part of said supporting column is provided with a wheel, a lower part of said supporting column is provided with a driving gear, a bottom end of said supporting column is provided with a cam; said upper part of said supporting column is extended into said grain storage component, and said wheel is contained in said grain storage component; said driving gear is rotatably connected with said driving component, said cam is connected with said throwing component; said grain storage component is provided with an upper feeding channel, said throwing component has a throwing grain channel, a lower feeding channel communicates said upper feeding channel and said throwing grain channel; said driving component drives said driving gear to rotate, therefore driving said supporting column, said wheel and said cam to rotate synchronously, said rotating component agitates grain in said grain storage component to fall into said upper feeding channel, said gain falls into said throwing grain channel by said lower feeding channel and is thrown out by said throwing component.

2. The smart pet feeder according to claim 1, wherein said driving component includes a motor, a belt pulley and a worm; one end of said belt pulley is fixed with said motor, the other end of said belt pulley is fixed with said worm, and helical teeth of said worm are meshed with said driving gear.

3. The smart pet feeder according to claim 2, wherein said belt pulley comprises a small belt pulley, a large belt pulley, a connecting shaft, a synchronous wheel, a first belt and a second belt; said small pulley is fixed at said connecting shaft, and said large pulley is fixed at said worm; said motor has a shaft which is provided with a driving wheel; said first belt connects said small pulley and said driving wheel, said second belt connects said large pulley and said synchronization wheel; said synchronous wheel is fixed on said connecting shaft; said motor drives said driving wheel to rotate, thereby driving said worm to rotate through said first belt and said second belt.

4. The smart pet feeder according to claim 1, wherein said grain storage component includes a grain storage tank and a grain delivery assembly arranged below said grain storage tank; a top of said grain storage tank is provided with an opening, and a side wall of said grain storage tank is provided with an inclined downwardly grain guiding plate, a bottom of said grain guiding plate is provided with a grain mouth; said grain delivery assembly has a top cover, and a middle of said top cover is depressed to forms a groove, a notch is formed on one side of said end cover and that side of said groove, and at said notch a step surface is formed by extending from a bottom of said groove downwardly; a baffle is arranged at a lower part of said step surface, and a feeding port is formed between said step surface and said baffle; said end cover is provided with a plate at said notch, said plate has a horizontal part and a vertical part; said horizontal part blocks said notch from a top of said notch, and an edge of said horizontal part is provided with a tooth slice extending into said groove; said vertical part matches said step surface and said baffle to form said upper feeding channel.

5. The smart pet feeder according to claim 4, wherein said bottom of said grain guiding plate is also provided with an first column hole; a top of said supporting column rotatably passes through said first column hole into said grain storage tank; said top of said supporting column is provided with a wing.

6. The smart pet feeder according to claim 4, wherein a bottom surface center of said groove forms a second column hole, said upper part of said supporting column rotatably passes through said second column hole into said groove, and said wheel is placed in said groove; edges of said wheel are composed of protrusions and recesses arranged alternately and uniformly.

7. The smart pet feeder according to claim 4, wherein the below of said grain storage assembly is provided with an upper mounting member; said upper mounting member has a mounting plate, and a center of said mounting plate forms a third column hole; one side of said mounting plate is provided with said lower feeding channel, a top of said lower feeding channel is connected with a bottom of said upper feeding channel, and said lower feeding channel and said bottom of said upper feeding channel are matched in shape; said bottom of said lower feeding channel has a feed opening.

8. The smart pet feeder according to claim 7, wherein the other side of said mounting plate is provided with an installation slot, said installation slot is provided with a mounting cover on it; said mounting cover is provided with a groove cover matched with said installation slot; a side of said groove cover is provided with a vortex rod cover;

said driving component includes a motor, a belt pulley and a worm; one end of said belt pulley is fixed with said motor, the other end of said belt pulley is fixed with said worm, and an helical teeth of said worm are meshed with said driving gear;

said belt pulley and said worm are pivoted with said installation slot; said worm passes through said installation slot and is erected on said mounting plate; said belt pulley is set in said installation slot; said mounting cover partly covers said belt pulley; said vortex rod cover is set above said worm and covered it.

9. The smart pet feeder according to claim 7, wherein said lower part of said supporting column rotates through said third column hole; said driving gear is arranged above said mounting plate and meshes with spiral teeth of said worm.

10. The smart pet feeder according to claim 7, wherein said throwing component is arranged below said upper mounting member, including a throwing grain channel, a spring rod, a pushing plate and a seat; said throwing grain channel is arranged in a cylindrical shape, one end of which extends to form an arc groove; said arc groove matches said feed opening so that said grain can be fed into said throwing grain channel from said lower feeding channel; a feeding port is arranged on one side of said shell, and said throwing grain channel is directly opposite said feeding port; one end of said spring rod is inserted into said seat, a middle of said spring rod is provided with a limiting plate, the other end of said spring rod is inserted into said throwing grain channel, and a pushing piece is arranged at thereof; said pushing piece matches an inner cavity of said throwing channel and can slide therein; said spring rod is provided with a spring between said limiting plate and said seat; said pushing plate has an pivot end and a plug end, said pivot end is pivoted at a bottom of said mounting plate, and said plug end is arranged between said limiting plate and said throwing grain channel, said plug end is provided with an inserting slot, and said spring rod passes through said plug end at said inserting slot; said pushing plate is also provided with a cam groove; an edge of said cam is provided with a plurality of gear teeth; said gear teeth can extend into said cam groove and push said pushing plate to rotate.

11. The smart pet feeder according to claim 1, wherein a side wall of said grain storage tank is provided with a camera component, which including a camera and an infrared night vision lamp.

12. The smart pet feeder according to claim 1, wherein said smart pet feeder also includes a control unit; said control unit includes a control module and a wireless communication module; said control module is electrically connected with said wireless communication module, said driving component and a camera component, respectively; said wireless communication module receives instructions from client and feeds back to said control module, which controls said driving component or said camera component to operate according to said instructions.

13. The smart pet feeder according to claim 1, wherein said smart pet feeder also includes a control unit, said control unit includes a control module, a feeding module, and a detecting module; said control module is electrically connected with said feeding module, said detecting module and said driving component.

14. The smart pet feeder according to claim 13, wherein said control unit also includes an infrared detection module; said infrared detection module is electrically connected with said control module; said infrared detection module is used to detect food retention in said upper feeding channel; if a food retention is detected, a food retention feedback signal is sent to said control module, which controls said driving component to stop running.

15. The smart pet feeder according to claim 14, wherein said control unit also includes a manual feeding module; said manual feeding module is electrically connected with said control module, and said manual feeding module is triggered, and said control module controls said driving component to run.

* * * * *